United States Patent
Gu et al.

(10) Patent No.: US 11,869,194 B2
(45) Date of Patent: Jan. 9, 2024

(54) IMAGE PROCESSING METHOD AND APPARATUS, COMPUTER-READABLE STORAGE MEDIUM

(71) Applicant: TENCENT TECHNOLOGY (SHENZHEN) COMPANY LIMITED, Shenzhen (CN)

(72) Inventors: Xiaoguang Gu, Shenzhen (CN); Libo Fu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 230 days.

(21) Appl. No.: 17/388,313

(22) Filed: Jul. 29, 2021

(65) Prior Publication Data
US 2021/0366127 A1 Nov. 25, 2021

Related U.S. Application Data

(63) Continuation of application No. PCT/CN2020/085732, filed on Apr. 20, 2020.

(30) Foreign Application Priority Data

May 7, 2019 (CN) .......................... 201910373797.2

(51) Int. Cl.
*G06T 7/11* (2017.01)
*G06T 7/187* (2017.01)
(Continued)

(52) U.S. Cl.
CPC ............... *G06T 7/11* (2017.01); *G06F 18/23* (2023.01); *G06T 7/12* (2017.01); *G06T 7/187* (2017.01);
(Continued)

(58) Field of Classification Search
CPC ............ G06T 7/11; G06T 2207/20081; G06T 2207/20084; G06T 7/194;
(Continued)

(56) References Cited

U.S. PATENT DOCUMENTS

2012/0020554 A1* 1/2012 Sun .......................... G06T 7/11
382/164
2014/0301639 A1* 10/2014 Schlosser ............... H04N 5/272
382/165
(Continued)

FOREIGN PATENT DOCUMENTS

CN      108427951         8/2018
CN      108427951 A   *   8/2018
(Continued)

OTHER PUBLICATIONS

English translation of International Search Report dated Jul. 24, 2020 in International Application No. PCT/CN2020/085732.

*Primary Examiner* — Ian L Lemieux
*Assistant Examiner* — Woo C Rhim
(74) *Attorney, Agent, or Firm* — Crowell & Moring LLP

(57) ABSTRACT

Embodiments of this disclosure include a method and an apparatus for processing image. The method may include obtaining a to-be-processed image and performing image semantic segmentation on the to-be-processed image to obtain a semantically-segmented image. The semantically-segmented image may include a target region and a non-target region obtained through the semantic segmentation. The method may further include performing pose recognition on the to-be-processed image, to obtain a pose-recognized image recognizing skeletal region. The method may further include fusing the target region and the non-target region of the semantically-segmented image with the skeletal region of the pose-recognized image, to obtain a trimap comprising foreground region, background region, and rec-
(Continued)

ognition region. The method may further include generating, according to the to-be-processed image and the trimap, a transparency mask image for separating image from the to-be-processed image.

14 Claims, 8 Drawing Sheets

(51) Int. Cl.
  *G06T 7/12* (2017.01)
  *G06T 7/194* (2017.01)
  *G06T 7/73* (2017.01)
  *H04N 5/272* (2006.01)
  *G06V 40/10* (2022.01)
  *G06F 18/23* (2023.01)

(52) U.S. Cl.
  CPC .............. *G06T 7/194* (2017.01); *G06T 7/75* (2017.01); *G06V 40/10* (2022.01); *H04N 5/272* (2013.01); *G06T 2207/10016* (2013.01); *G06T 2207/30196* (2013.01)

(58) Field of Classification Search
  CPC . G06T 2207/20221; G06T 2207/10004; G06T 2207/10024; G06T 2207/30196; G06T 5/002; G06T 7/12; G06T 7/73; G06T 5/30; G06T 7/10; G06T 2207/10016; G06T 7/13; G06T 7/75; G06T 7/155; G06T 7/181; G06T 2207/20112; G06T 2207/20192; G06T 2207/20044; G06T 2207/20036; G06N 3/045; G06F 18/23; G06V 10/82; G06V 40/10; G06V 10/267; G06V 10/26; G06V 10/764; G06V 10/44; G06V 10/806; G06V 10/42; G06V 20/41; H04N 5/272
  See application file for complete search history.

(56) References Cited

U.S. PATENT DOCUMENTS

| | | | |
|---|---|---|---|
| 2015/0213611 A1* | 7/2015 | Dai | G06T 7/194 382/199 |
| 2016/0110876 A1* | 4/2016 | Song | G06T 7/194 382/164 |
| 2016/0117832 A1* | 4/2016 | Liu | G06T 7/215 382/164 |
| 2016/0133027 A1* | 5/2016 | Zhao | G06T 7/194 382/173 |
| 2016/0358337 A1* | 12/2016 | Dai | G06T 7/11 |
| 2016/0364877 A1* | 12/2016 | Kim | G06V 10/464 |
| 2017/0358092 A1* | 12/2017 | Bleibel | H04N 5/272 |
| 2018/0357789 A1* | 12/2018 | Yang | G06T 7/73 |
| 2019/0171871 A1* | 6/2019 | Zhang | G06V 40/103 |
| 2019/0206088 A1* | 7/2019 | Duan | G06T 5/30 |
| 2020/0020108 A1* | 1/2020 | Pao | G06T 7/90 |
| 2020/0193152 A1* | 6/2020 | Vesdapunt | G06T 7/75 |
| 2020/0311946 A1* | 10/2020 | Price | G06T 7/11 |
| 2020/0341580 A1* | 10/2020 | Rosenbaum | G06V 40/20 |
| 2021/0118144 A1* | 4/2021 | Li | G06T 7/11 |
| 2022/0130056 A1* | 4/2022 | Zhang | G06T 13/40 |
| 2022/0405550 A1* | 12/2022 | Wang | G06V 40/103 |

FOREIGN PATENT DOCUMENTS

| | | | | |
|---|---|---|---|---|
| CN | 108805203 | | 11/2018 | |
| CN | 108805203 A | * | 11/2018 | |
| CN | 109448007 A | * | 3/2019 | .............. G06T 7/11 |
| CN | 109712145 | | 5/2019 | |
| CN | 109712145 A | * | 5/2019 | |
| CN | 110335277 | | 10/2019 | |
| WO | WO-2020000096 A1 | * | 1/2020 | .......... A61B 5/1116 |

* cited by examiner (a) (b) (c)

(d) (e)

IMAGE PROCESSING METHOD AND APPARATUS, COMPUTER-READABLE STORAGE MEDIUM

CROSS-REFERENCE TO RELATED APPLICATION

This application is a continuation application of PCT Patent Application No. PCT/CN2020/085732, filed on Apr. 20, 2020, which claims priority to Chinese Patent Application No. 2019103737972, entitled "IMAGE PROCESSING METHOD AND APPARATUS, COMPUTER-READABLE STORAGE MEDIUM, AND COMPUTER DEVICE" and filed on May 7, 2019, wherein the content of each of the above-referenced applications is incorporated herein by reference in its entirety.

FIELD OF THE TECHNOLOGY

This application relates to the field of computer technologies, and in particular, to an image processing method and apparatus, a computer-readable storage medium, and a computer device.

BACKGROUND OF THE DISCLOSURE

With the development of computer technologies, image processing is becoming prevalent. Image matting is an image editing technology having a wide range of applications. Generally, during matting on an image, a transparency mask image first needs to be generated, and then target extraction is performed on the image based on the transparency mask image. The transparency mask image may alternatively be referred to as a mask or an alpha matte.

SUMMARY

In view of this, for the technical problem of low image processing efficiency, it is necessary to provide an image processing method and apparatus, a computer-readable storage medium, and a computer device.

In an embodiment, an image processing method is provided. The method may include obtaining a to-be-processed image and performing image semantic segmentation on the to-be-processed image to obtain a semantically-segmented image. The semantically-segmented image may include a target region and a non-target region obtained through the semantic segmentation. The method may further include performing pose recognition on the to-be-processed image, to obtain a pose-recognized image recognizing skeletal region. The method may further include fusing the target region and the non-target region of the semantically-segmented image with the skeletal region of the pose-recognized image, to obtain a trimap comprising foreground region, background region, and recognition region. The method may further include generating, according to the to-be-processed image and the trimap, a transparency mask image for separating image from the to-be-processed image.

In another embodiment, an image processing apparatus is provided. The apparatus may include a memory operable to store computer-readable instructions and a processor operable to read the computer-readable instructions. The processor, when executing the computer-readable instructions, may be configured to obtain a to-be-processed image and perform image semantic segmentation on the to-be-processed image to obtain a semantically-segmented image. The semantically-segmented image may include a target region and a non-target region obtained through the semantic segmentation. The processor may further be configured to perform pose recognition on the to-be-processed image, to obtain a pose-recognized image recognizing skeletal region. The processor may further be configured to fuse the target region and the non-target region of the semantically-segmented image with the skeletal region of the pose-recognized image, to obtain a trimap comprising foreground region, background region, and recognition region. The processor may further be configured to generate, according to the to-be-processed image and the trimap, a transparency mask image for separating image from the to-be-processed image.

In another embodiment, a non-transitory computer-readable storage medium is provided, which has processor executable instructions stored thereon. The instructions may cause a processor to obtain a to-be-processed image and perform image semantic segmentation on the to-be-processed image to obtain a semantically-segmented image. The semantically-segmented image may include a target region and a non-target region obtained through the semantic segmentation. The instructions may cause the processor to perform pose recognition on the to-be-processed image, to obtain a pose-recognized image recognizing skeletal region. The instructions may cause the processor to fuse the target region and the non-target region of the semantically-segmented image with the skeletal region of the pose-recognized image, to obtain a trimap comprising foreground region, background region, and recognition region. The instructions may cause the processor to generate, according to the to-be-processed image and the trimap, a transparency mask image for separating image from the to-be-processed image.

According to the image processing method and apparatus, the computer-readable storage medium, and the computer device, after a to-be-processed image is obtained, image semantic segmentation is automatically performed on the to-be-processed image to obtain a semantically-segmented image, and pose recognition is automatically performed on the to-be-processed image. Because the obtained semantically-segmented image includes a target region and a non-target region obtained through the semantic segmentation, and an obtained pose-recognized image includes a skeletal region, the two frames of images can be automatically fused to obtain a trimap whose foreground region, background region, and recognition region have been obtained through partition, and a transparency mask image for separating image from the to-be-processed image can be generated according to the to-be-processed image and the trimap. The entire process of generating the transparency mask image does not require participation of a user, which greatly improves generation efficiency of the transparency mask image, thereby improving image processing efficiency.

DESCRIPTION OF EMBODIMENTS

To make objectives, technical solutions, and advantages of this disclosure clearer and more understandable, this disclosure is further described in detail below with reference to the accompanying drawings and the embodiments. It is to be understood that the specific embodiments described herein are merely used for explaining this disclosure, and are not intended to limit this disclosure.

Figure 1:
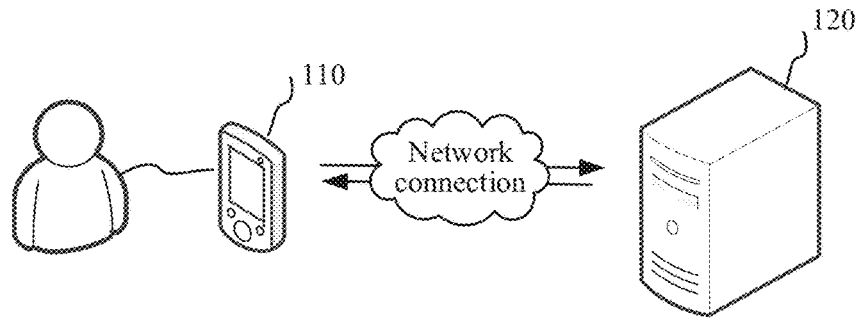
FIG. 1 is a diagram of an application environment of an image processing method according to an embodiment.

FIG. 1 is a diagram of an application environment of an image processing method according to an embodiment. Referring to FIG. 1, the image processing method is applied to an image processing system. The image processing system includes a terminal 110 and a server 120. The terminal 110 and the server 120 are connected by using a network. The terminal 110 may be a desktop terminal or a mobile terminal. The desktop terminal may be a desktop computer, and the mobile terminal may be at least one of a mobile phone, a tablet computer, a notebook computer, and the like. The server 120 may be implemented by using an independent server or a server cluster including a plurality of servers, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 110 and the server 120 may be used separately to perform the image processing method, or may be used collaboratively to perform the image processing method.

The terminal 110 may be generally one of a plurality of terminals. In this embodiment, only the terminal 110 is used as an example for description.

A person skilled in the art may learn that there may be more or fewer terminals. For example, there may be only one terminal, or there may be dozens of or hundreds of or more terminals. In this case, the application environment further includes another terminal. The quantity and the device type of the terminals are not limited in the embodiments of this disclosure.

Figure 2:
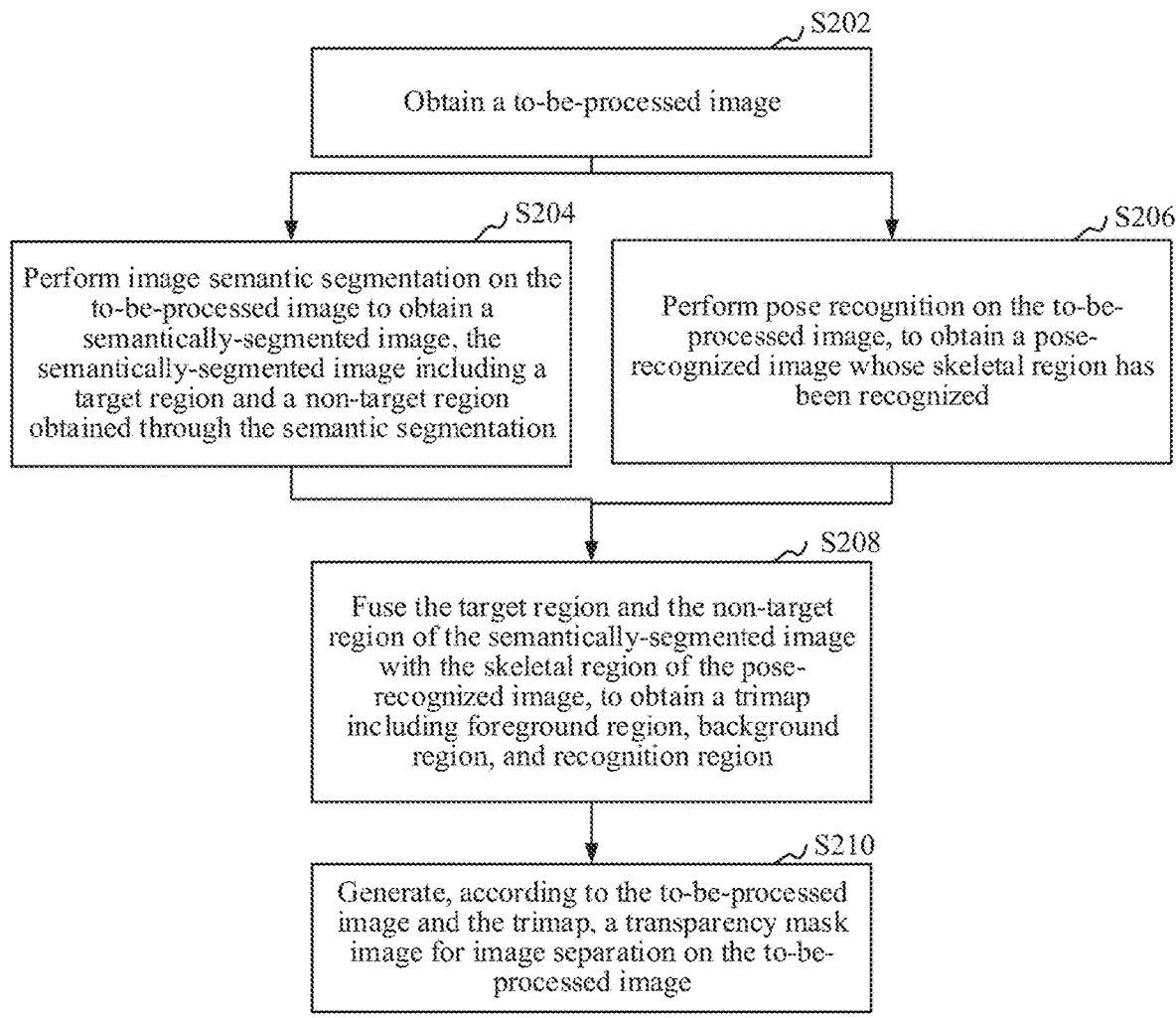
FIG. 2 is a schematic flowchart of an image processing method according to an embodiment.

As shown in FIG. 2, in an embodiment, an image processing method is provided. This embodiment is mainly described by using an example in which the method is applied to a computer device. The computer device may specifically be the terminal 110 or the server 120 in FIG. 1. Referring to FIG. 2, the image processing method specifically includes the following steps:

S202: The computer device obtains a to-be-processed image.

The to-be-processed image is an image to be processed by using the image processing method provided in this embodiment of this disclosure. The to-be-processed image may be an image acquired in real time by using an image acquisition apparatus, or may be an existing image crawled from a network, or may be a video frame image separated from a video, or may certainly be an image shot by using a mobile terminal and stored in the mobile terminal, or the like.

In an implementation, the computer device may acquire an image in real time by using an image acquisition apparatus, and use the image acquired in real time as a to-be-processed image. The computer device may alternatively crawl an image from a network, and use the image as a to-be-processed image. The computer device may alternatively obtain an image generated locally, for example, an image separated from a video or an image synthesized on the computer device by a user, and use the image as a to-be-processed image. The computer device may alternatively obtain an image transmitted by another computer device, for example, an image shared between users by using computer devices, and use the image as a to-be-processed image.

S204: The computer device performs image semantic segmentation on the to-be-processed image to obtain a semantically-segmented image, the semantically-segmented image including a target region and a non-target region obtained through the semantic segmentation.

The image semantic segmentation is to partition pixels in an image according to different expressed semantics. The image semantic segmentation is used for partitioning the image into a plurality of pixel regions according to the semantics. Essentially, the image semantic segmentation implements pixel-level classification on an image, and semantic labeling of the entire image is implemented through pixel classification. A classification unit is not limited in this embodiment of this disclosure, which may be a pixel, or may be an image block. One image block includes a plurality of pixels.

The target region is a region in which a target in the to-be-processed image is located. The non-target region is a remaining region in the to-be-processed image after the target region is excluded. The target may be a static target, for example, a building, a tree, or a stationary table or chair. The target may alternatively be a dynamic target, for example, a natural person, an animal, or a plane. The target may be a full object, for example, a body of a natural person or an entire building; or may be a local object, for example, a face of a natural person, a hand of a natural person, or a foot of a natural person.

There may be one or more targets in the to-be-processed image. There may be one or more target regions obtained through segmentation in the to-be-processed image.

In an implementation, the computer device may encode the to-be-processed image into a semantic segmentation feature matrix, and process the semantic segmentation feature matrix, to determine values at different locations in the semantic segmentation feature matrix. Each value may correspond to one pixel. Subsequently, the computer device decodes the semantic segmentation feature matrix to obtain a semantically-segmented image, and then segments a target region from the semantically-segmented image according to pixels within a target category. A remaining region is a non-target region. Pixels in the semantically-segmented image have pixel values representing semantic categories that the pixels are within, and correspond to pixels in the to-be-processed image.

A person skilled in the art may understand that the semantic segmentation feature matrix is a low-dimensional expression of semantic features of image content in an image frame, and covers semantic feature information of the entire image frame. The semantically-segmented image is an image segmented into a plurality of regions that do not overlap with each other and have specific semantics. The pixel values of the pixels in the semantically-segmented image are used for reflecting the semantic categories that the corresponding pixels are within. The pixels may be classified through binary classification or multinomial classification. The binary classification of pixels may be used for distinguishing a target of one category from a target of another category in an image, for example, distinguishing pixels corresponding to a road from other pixels in a map image. The multinomial classification of pixels may be used for determining categories that a plurality of targets are within in an image, for example, pixels corresponding to the sky, pixels corresponding to the earth, and pixels corresponding to a person in a scenery image. An image size of the semantically-segmented image is consistent with an image size of the original image frame. In this way, it may be understood as follows: The obtained image frame is classified in a pixel-by-pixel manner, and a category that each pixel in the obtained image frame is within may be obtained according to the pixel values of the pixels in the semantically-segmented image. The semantically-segmented image is described by using the binary classification of pixels as an example. After the computer device processes the semantic segmentation feature matrix, a matrix obtained may be a matrix including only values 0 and 1, 1 indicating that a pixel corresponding to the location is within a target category, and 0 indicating that a pixel corresponding to the location is not within the target category. The values are converted into pixel values of pixels in the semantically-segmented image, that is, 0 or 1, which indicate whether the pixels are within the target category.

A manner of image semantic segmentation is not limited in this embodiment of this disclosure, provided that a target region and a non-target region can be obtained through partition from the to-be-processed image. For example, a Deeplab method may be used.

In an embodiment, the to-be-processed image may be an image including a human. Correspondingly, the target may be the human, the target region is a human region, and the non-target region is a non-human region. In this case, the computer device can partition the to-be-processed image into two parts, namely, the human region and the non-human region, by performing semantic segmentation on the to-be-processed image. There may be one or more human regions obtained through partition.

Figure 3:
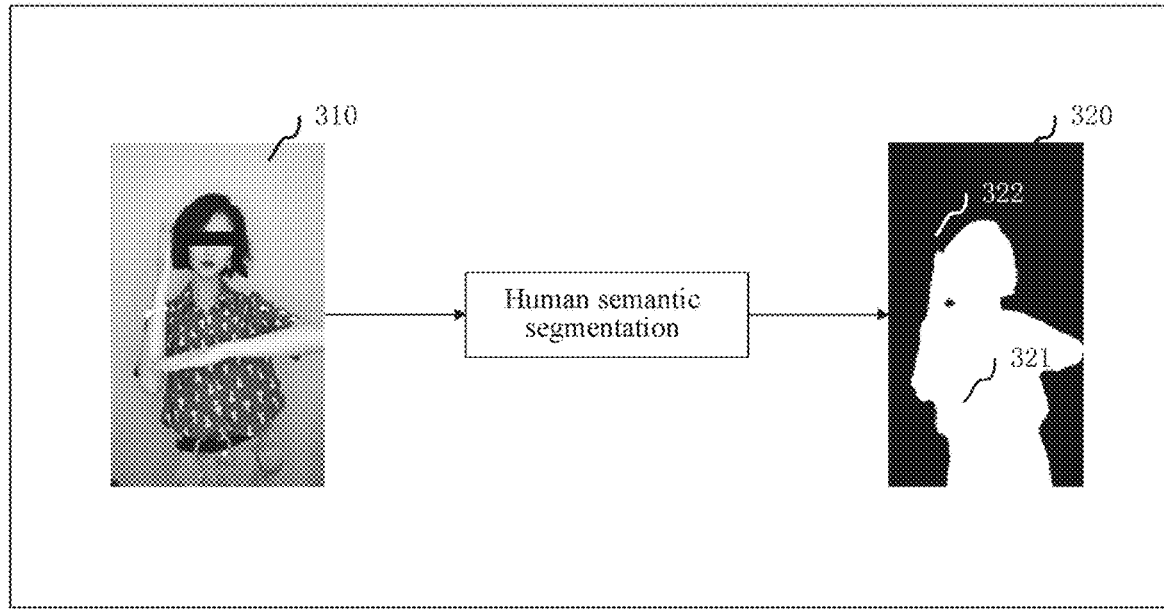
FIG. 3 is a schematic diagram of image semantic segmentation according to an embodiment.

For example, FIG. 3 is a schematic diagram of image semantic segmentation according to an embodiment. Referring to FIG. 3, the computer device performs human semantic segmentation on a to-be-processed image 310, that is, performs semantic segmentation of whether being within human semantics on the to-be-processed image 310 in a pixel-by-pixel manner, to obtain a semantically-segmented image 320. The semantically-segmented image 320 includes a target region (white region 321) and a non-target region (black region) 322.

S206: The computer device performs pose recognition on the to-be-processed image, to obtain a pose-recognized image whose skeletal region has been recognized.

A pose is a morphology presented by the target in the to-be-processed image, for example, a flight pose of a plane, a walking pose of a natural person, or a running pose of an animal. The skeletal region is a region in which a supporting structure of the target is located. The supporting structure of the target may be a structure that ensures a basic shape of the target, for example, a keel of a plane or a building, or a skeleton of a natural person or an animal. There may be one or more skeletal regions in the to-be-processed image.

In an implementation, the computer device may detect skeletal key points of the target in the to-be-processed image, and predict the skeletal region according to the skeletal key points, to obtain the pose-recognized image whose skeletal region has been recognized. A manner of pose recognition is not limited in this embodiment of this disclosure, provided that a skeletal region can be obtained through partition from the to-be-processed image. For example, a human pose estimation (AlphaPose) method or a human pose recognition (OpenPose) method may be used.

In an embodiment, the to-be-processed image is an image including a human, and the skeletal region is a human skeletal region. In this case, the computer device performs pose recognition on the to-be-processed image, to determine skeletal key points of the human in the to-be-processed image, and can obtain the human skeletal region from the to-be-processed image through partition according to a plurality of skeletal key points of the human. There may be one or more human skeletal regions obtained through partition.

Figure 4:
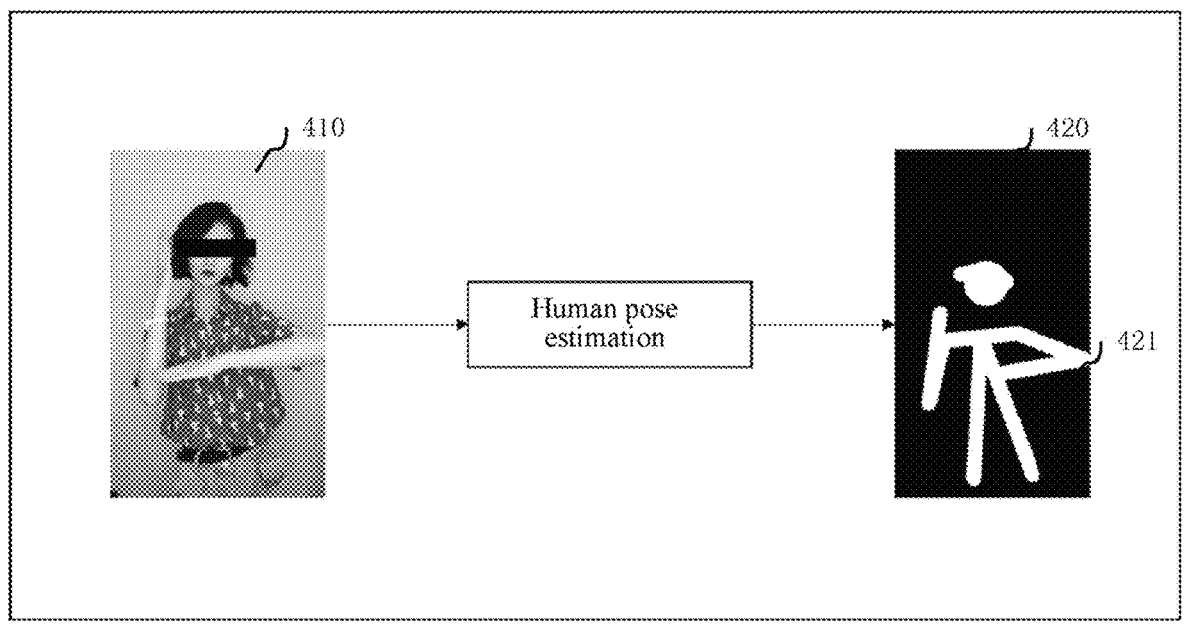
FIG. 4 is a schematic diagram of human pose recognition according to an embodiment.

For example, FIG. 4 is a schematic diagram of human pose recognition according to an embodiment. Referring to FIG. 4, the computer device performs human pose recognition on a to-be-processed image 410 to obtain a pose-recognized image 420. The pose-recognized image 420 includes a human skeletal region (white region) 421 and a non-human-skeletal region (black region).

S208: The computer device fuses the target region and the non-target region of the semantically-segmented image and the skeletal region of the pose-recognized image, to obtain a trimap whose foreground region, background region, and recognition region have been obtained through partition.

The trimap is an image in which an edge contour for region partition in the image is labeled, and is an image providing constraint information for an image separation operation. Generally, the trimap includes three parts: a foreground region, a background region, and a recognition region. The foreground region is a region in which content that needs to be separated from the image is located. The background region is a region in which content that does not need to be separated from the image is located. The recognition region is a region that is uncertain to be a foreground region or a background region.

In an implementation, the computer device may combine the target region and the non-target region of the semantically-segmented image and the skeletal region of the pose-recognized image, to obtain a trimap whose foreground region, background region, and recognition region have been obtained through partition. For example, the computer device may use the non-target region in the semantically-segmented image as the background region, use a region, corresponding to the skeletal region of the pose-recognized image, in the semantically-segmented image as the foreground region, and use a region in the target region after the foreground region is excluded as the recognition region, to obtain the trimap whose foreground region, background region, and recognition region have been obtained through partition.

In an embodiment, in a scenario requiring high image separation accuracy or low semantic segmentation accuracy, the computer device may use a semantic segmentation result as heuristic information, expand a part with an inaccurate edge, and then generates a trimap based on an image obtained after the edge expansion.

In an implementation, in an embodiment, S208 includes: expanding a region boundary between the target region and the non-target region in the semantically-segmented image; using a remaining non-target region in the semantically-segmented image after the expansion as the background region, and using a region, corresponding to the skeletal region of the pose-recognized image, in the semantically-segmented image as the foreground region, to obtain the trimap whose foreground region, background region, and recognition region have been obtained through partition, the recognition region of the trimap being a remaining region in the semantically-segmented image after the background region and the foreground region are excluded.

In an embodiment, the expanding a region boundary between the target region and the non-target region in the semantically-segmented image includes: performing edge detection on the target region and the non-target region, to obtain the region boundary between the target region and the non-target region; and expanding the region boundary in the semantically-segmented image toward two sides by using the region boundary as a center.

The edge generally refers to a region in which a part of the image has a dramatic change in intensity. The edge in this embodiment refers to a boundary between the target region and the non-target region in the semantically-segmented image. In an implementation, the computer device may determine the region boundary between the target region and the non-target region in the semantically-segmented image by using an edge detection algorithm, and then expand the region boundary in the semantically-segmented image toward two sides by using the region boundary as a center. An objective of expanding in this way is to mark an inaccurate part of the edge as an "unknown" part (to-be-recognized part) in the trimap by using the semantic segmentation result as heuristic information, to facilitate further processing in subsequent steps.

The edge detection algorithm is not limited in this embodiment of this disclosure, provided that edge detection can be performed. The edge detection is a type of filtering, whose detection effect varies with different operators. There are three common methods: a Sobel operator, a Laplacian operator, and a Canny operator.

Figure 5:
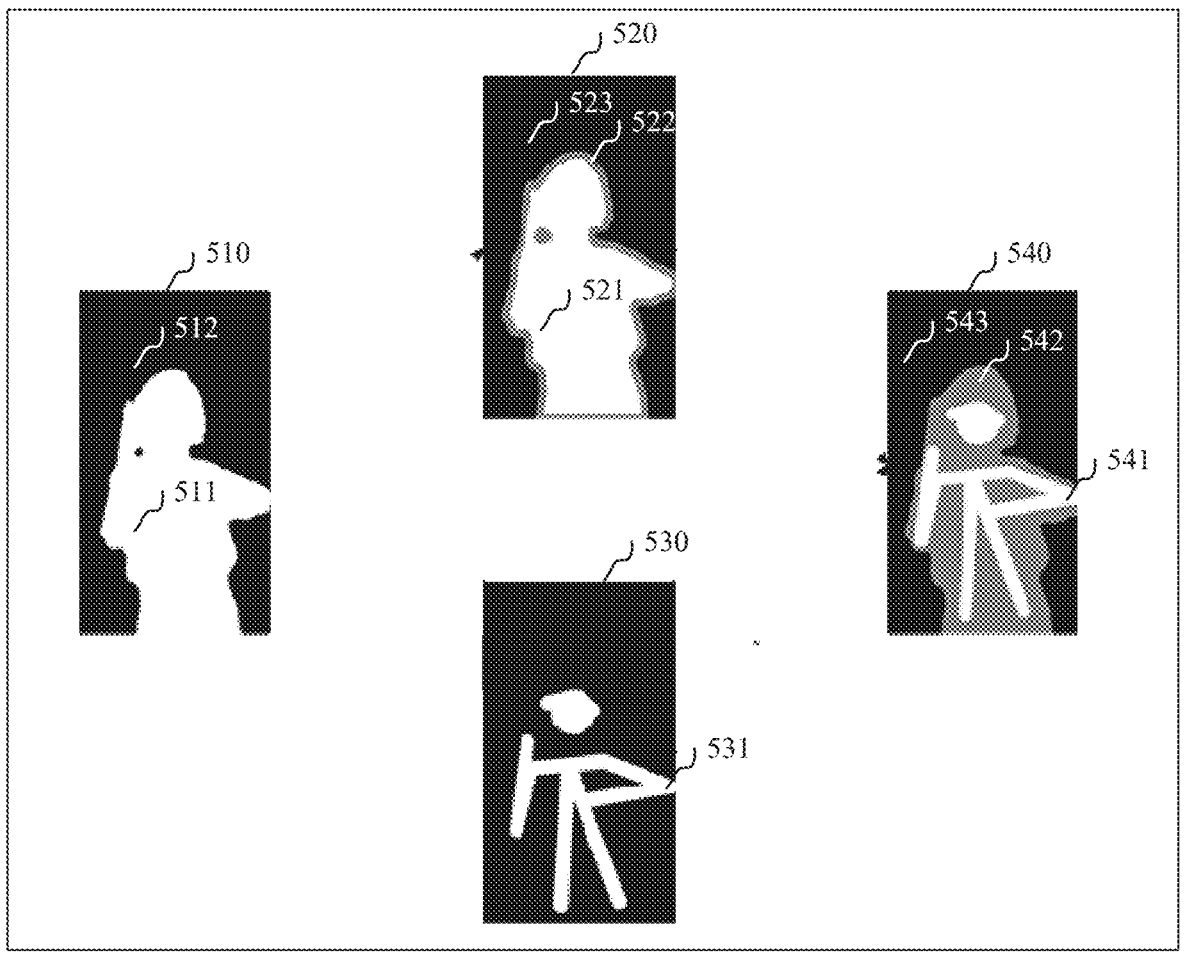
FIG. 5 is a schematic principle diagram of fusing a semantically-segmented image and a pose-recognized image to obtain a trimap according to an embodiment.

FIG. 5 is a schematic principle diagram of fusing a semantically-segmented image and a pose-recognized image to obtain a trimap according to an embodiment. Referring to FIG. 5, a semantically-segmented image 510 includes a target region 511 in white and a non-target region 512 in black. The computer device expands a region boundary between the target region 511 and the non-target region 512 in the semantically-segmented image 510. An expanded semantically-segmented image 520 includes a target region 521 in white, an expanded region 522 in gray, and a non-target region 523 in black.

Further, the computer device may use a remaining non-target region in the semantically-segmented image after the expansion as a background region, use a region, corresponding to a skeletal region of a pose-recognized image, in the semantically-segmented image as a foreground region, and use a remaining region as a recognition region. In this way, a trimap whose foreground region, background region, and recognition region have been obtained through partition can be obtained.

Still referring to FIG. 5, a pose-recognized image 530 includes a skeletal region 531 in white and a non-skeletal region in black. The computer device may combine the expanded semantically-segmented image 520 and the pose-recognized image 530, use the non-target region 523 of the expanded semantically-segmented image 520 as a background region, use the expanded region 522 as a recognition region, use a region, corresponding to the skeletal region 531 of the pose-recognized image 530, in the target region 521 as a foreground region, and merge the remaining target region into the recognition region. In this way, a trimap 540 is obtained through combination. The trimap 540 includes three parts: a foreground region 541 in white, a recognition region 542 in gray, and a background region 543.

In the foregoing embodiment, the computer device provides specific steps for generating a trimap by using results of semantic segmentation and pose recognition: obtaining a coarse segmentation boundary of a foreground by using a semantic segmentation technology, then extracting a skeletal region based on pose estimation, using a result of the pose estimation as a determined foreground, and using the foreground obtained through semantic segmentation as an undetermined region, to generate a more accurate transparency mask image according to the trimap subsequently.

S210: The computer device generates, according to the to-be-processed image and the trimap, a transparency mask image for image separation from the to-be-processed image.

The image separation is to separate some regions in an image from the image. The image separation may be generally referred to as image matting. The transparency mask image may alternatively be referred to as a transparency matte, which is an image using transparency as pixel values of pixels and used for performing image separation on an image.

For example, in a transparency mask image A of an image P, transparency (that is, a pixel value of a pixel) is represented by using a decimal from 0 to 1. 1.0 represents being completely transparent, 0.0 represents being completely opaque, and other values represent being partially transparent. The transparency mask image A is multiplied by the image P. A foreground part is actually multiplied by 1.0, so that pixel values thereof are unchanged, and the foreground part is retained. A background part is actually multiplied by 0.0, so that all pixel values thereof are changed into zero, and the background part is removed. In this way, image matting is completed.

It may be understood that when the computer device generates the transparency mask image according to the to-be-processed image and the trimap, because both the foreground region and the recognition region that are obtained through partition in the current trimap are quite inaccurate, an incorrect prediction (for example, a background is determined as a foreground) may be made in a case that local information is insufficient (for example, a contrast is insufficiently sharp, noise is excessively loud, or a main background is flipped). In this case, global information needs to be taken into consideration in this case. The current trimap is coarse, but includes necessary foreground and background information. If reference can be made to global information (for example, information about colors near the background and the foreground), local prediction can be assisted, thereby avoiding an incorrect result. Therefore, in this embodiment, global sampling is performed on target pixels in a recognition region of the to-be-processed image according to the trimap to generate the transparency mask image. In this way, accuracy of the generated transparency mask image can be improved.

In an embodiment, S210 includes: performing, by the computer device, global sampling on the target pixels in the recognition region of the to-be-processed image according to the trimap, to select matching foreground pixels and matching background pixels for the target pixels; fusing the foreground pixels and the background pixels that match the target pixels, to obtain transparency corresponding to the target pixels; and generating, according to the transparency corresponding to the pixels in the to-be-processed image, the transparency mask image for image separation from the to-be-processed image.

The global sampling is to select an optimal candidate pair from a global sample set for a pixel in the recognition region. The global sample set refers to pixels in a region obtained by expanding the recognition region to a foreground region and a background region. The candidate pair is a pair of a foreground pixel and a background pixel. When an optimal candidate pair is selected for a pixel in the recognition region, distances between the optimal candidate pair and the pixel in a color space and a geometric space are considered.

In an implementation, the computer device may determine the global sample set and the recognition region in the to-be-processed image according to the trimap, and then select matching foreground pixels and matching background pixels from the global sample set for the target pixels in the recognition region. For each target pixel in the recognition region, the computer device may fuse a foreground pixel and a background pixel that match the target pixel to obtain a fused parameter. The fused parameter is transparency corresponding to the target pixel, that is, a pixel value of a pixel in the transparency mask image that corresponds to the target pixel.

In addition, the computer device may alternatively determine a foreground region and a background region in the to-be-processed image according to the trimap, set transparency corresponding to a pixel in the foreground region, that is, a pixel value of a pixel in the transparency mask image that corresponds to the pixel in the foreground region, to 1 (that is, completely transparent); and set transparency corresponding to a pixel in the background region, that is, a pixel value of a pixel in the transparency mask images that corresponds to the pixel in the background region, to 0 (that is, opaque). In this way, the computer device obtains a transparency mask image for image separation from the to-be-processed image.

Figure 6:
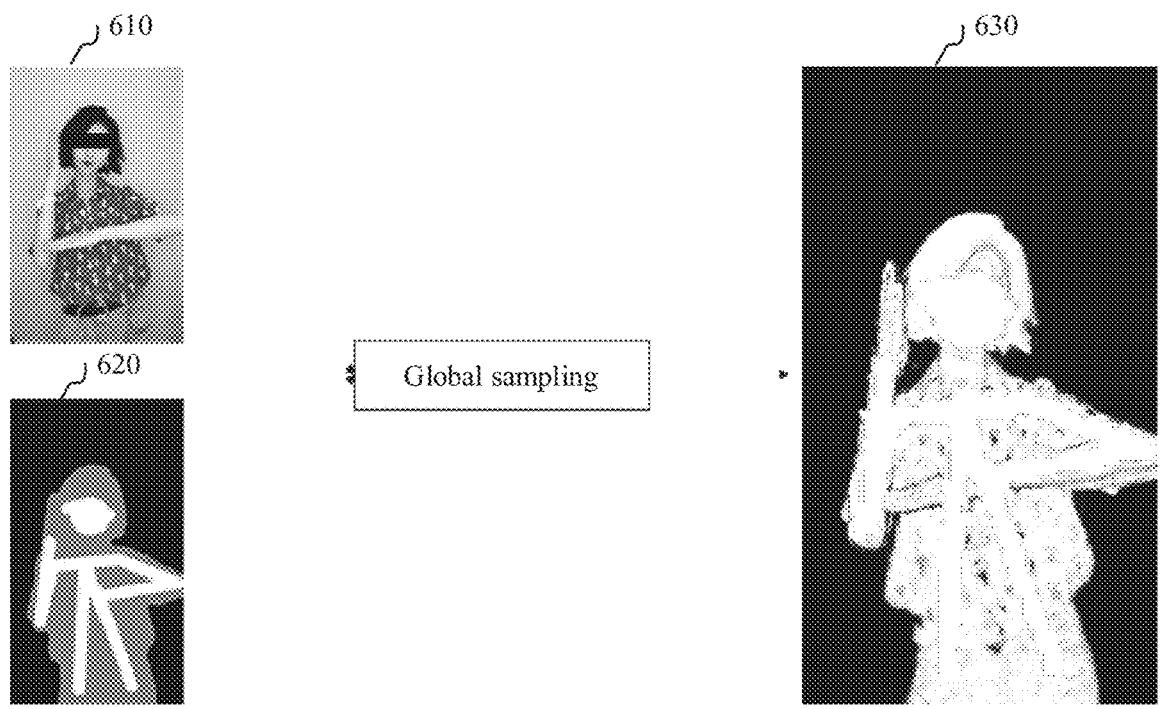
FIG. 6 is a schematic diagram of obtaining a transparency mask image according to a to-be-processed image and a trimap according to an embodiment.

For example, FIG. 6 is a schematic diagram of obtaining a transparency mask image according to a to-be-processed image and a trimap according to an embodiment. Referring to FIG. 6, it can be seen that after global sampling is performed on a to-be-processed image 610 and a trimap 620, a transparency mask image 630 can be obtained.

In this embodiment, the computer device performs global sampling on the to-be-processed image according to the trimap, so that reference can be made to global information, thereby improving accuracy of the generated transparency mask image.

It may be understood that, there may be an uneven region in the transparency mask image obtained by the computer device through global sampling. To further improve the accuracy of the transparency mask image, further post-processing steps may be performed on the transparency mask image obtained through global sampling.

In an embodiment, the generating, by the computer device according to the transparency corresponding to the pixels in the to-be-processed image, the transparency mask image for image separation from the to-be-processed image includes: using the transparency corresponding to the pixels in the to-be-processed image as pixel values of the pixels, to generate an intermediate image; and generating, after filtering and image morphology operations are performed on the intermediate image, the transparency mask image for image separation from the to-be-processed image.

The filtering is to suppress noise of an image under a condition that detail features of the image are retained as many as possible. The filtering operation in this embodiment may specifically be guided filtering. The image morphology operation is used for correcting a morphology of the image. The image morphology operation in this embodiment may specifically be dilation and erosion. The dilation is specifically an operation of calculating a local maximum value. In contrast to the dilation, the erosion is specifically an operation of calculating a local minimum value. Generally, the erosion is making a target region be "thinner", and the dilation is making a target region be "fatter".

In an implementation, after determining transparency corresponding to each pixel in the to-be-processed image through global sampling according to the trimap, the computer device uses transparency corresponding to pixels in the to-be-processed image as pixel values of pixels in an intermediate image, to generate the intermediate image. The computer device may further perform operations of guided filtering, dilation, and erosion on the intermediate image, to generate a transparency mask image. It may be understood that the intermediate image is also a transparency mask image, but its accuracy is lower than that of the transparency mask image obtained through post-processing.

Figure 7:
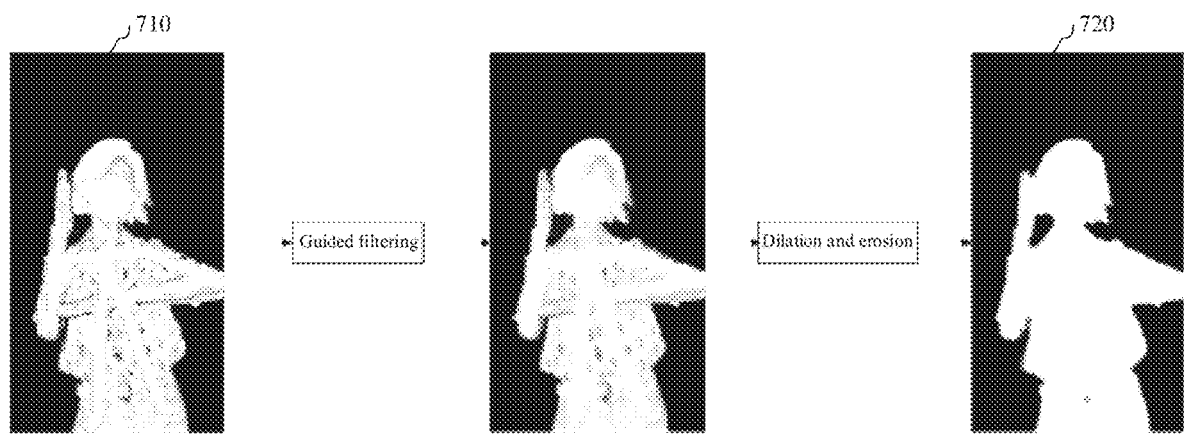
FIG. 7 is a schematic diagram of post-processing an intermediate image according to an embodiment.

For example, FIG. 7 is a schematic diagram of post-processing an intermediate image according to an embodiment. Referring to FIG. 7, it can be seen that after a guided filtering operation is performed on an intermediate image 710, there is an improvement in image accuracy; and after dilation and erosion are performed, a transparency mask image 720 is obtained, and there is a further improvement in the image accuracy.

In this embodiment, the computer device further improves the accuracy of the generated transparency mask image through post-processing of filtering and image morphology operations.

In an embodiment, the to-be-processed image is an image including a human. Correspondingly, the target may be the human, the target region is a human region, the non-target region is a non-human region, and the skeletal region is a human skeletal region. The generating, according to the to-be-processed image and the trimap, a transparency mask image for image separation from the to-be-processed image includes: generating, according to the to-be-processed image and the trimap, a transparency mask image for human image matting on the to-be-processed image.

According to the image processing method, after a to-be-processed image is obtained, image semantic segmentation is automatically performed on the to-be-processed image to obtain a semantically-segmented image, and pose recognition is automatically performed on the to-be-processed image. Because the obtained semantically-segmented image includes a target region and a non-target region obtained through the semantic segmentation, and an obtained pose-recognized image includes a skeletal region, the two frames of images can be automatically fused to obtain a trimap whose foreground region, background region, and recognition region have been obtained through partition, and a transparency mask image for image separation from the to-be-processed image can be generated according to the to-be-processed image and the trimap. The entire process of generating the transparency mask image does not require participation of a user, which greatly improves generation efficiency of the transparency mask image, thereby improving image processing efficiency.

In an embodiment, the performing, by the computer device, image semantic segmentation on the to-be-processed image to obtain a semantically-segmented image includes: inputting the to-be-processed image into an image semantic segmentation model; outputting a semantic category probability distribution matrix by using the image semantic segmentation model; and generating the semantically-segmented image according to the semantic category probability distribution matrix, pixels in the semantically-segmented image having pixel values representing semantic categories that the pixels are within, and being corresponding to pixels in the to-be-processed image, pixels in the target region being within a target semantic category, and pixels in the non-target region being not within the target semantic category.

The image semantic segmentation model is a machine learning model having a semantic segmentation function after being trained. Machine learning as a full name is briefly referred to as ML. The machine learning model may have a specific capability through sample learning. The machine learning model may include a neural network model, a support vector machine, or a logistic regression model, or the like. The neural network model is, for example, a convolutional neural network.

The image semantic segmentation model may be generally understood as a classifier, and is configured to classify, in a pixel-by-pixel manner, pixels included in an image inputted into the model. A quantity of classification categories of the image semantic segmentation model may be user-defined and controlled during training. In some possible implementations of this embodiment, the image semantic segmentation model is set to a binary classifier, and the classification categories include a target category and a non-target category. Pixels in the image inputted into the model that are within the target category are pixels in the target region, and pixels in the image inputted into the model that are not within the target category are pixels in the non-target region. In this way, the computer device may partition the pixels according to semantic categories that the pixels are within, to obtain the target region and the non-target region in the to-be-processed image through segmentation.

A matrix element of the semantic category probability distribution matrix has a value representing a probability that the matrix element is within the target category, and corresponds to a pixel in the image (that is, the to-be-processed image) inputted into the model. In other words, assuming that a pixel size of the to-be-processed image is 2*2, a matrix size of the semantic category probability distribution matrix is also 2*2, and a value of a matrix element at a matrix location (m, n) is a probability that a pixel at a pixel location (m, n) in the to-be-processed image is within the target category. The matrix (an image frame) uses a matrix location (a pixel location) at the upper left corner as (0, 0).

Specifically, the computer device may input the to-be-processed image into a pre-trained image semantic segmentation model, and output a semantic category probability distribution matrix by using the image semantic segmentation model. Then the computer device may determine a region enclosed by pixels corresponding to matrix elements whose probability values are greater than a preset probability in the semantic category probability distribution matrix as a target region. In this case, a remaining region in the to-be-processed image is a non-target region. The preset probability is a preset demarcation value used for determining whether pixels are classified into the target category.

The image semantic segmentation model may be trained in a supervised training manner. Specifically, the computer device may obtain training samples, and determine training labels corresponding to the training samples, that is, semantic categories that pixels in the training samples are within, to perform supervised training according to the training samples and the corresponding training labels.

In an embodiment, after obtaining the to-be-processed image, the computer device automatically inputs the image into the trained machine learning model, and determines the target region and the non-target region according to the semantic category probability distribution matrix outputted by the machine learning model. The matrix element in the semantic category probability distribution matrix has a value representing a probability that a corresponding pixel in the image frame is within the target category. In this way, the target region may be automatically determined according to pixels within the target category, thereby improving accuracy of image region partition, and providing a basis for subsequent processing.

In an embodiment, the performing, by the computer device, pose recognition on the to-be-processed image, to obtain a pose-recognized image whose skeletal region has been recognized includes: inputting the to-be-processed image into a pose recognition model; determining skeletal key points of a target in the to-be-processed image by using a hidden layer of the pose recognition model; and outputting, by using the pose recognition model, the pose-recognized image whose skeletal region has been recognized, the skeletal region being predicted according to the skeletal key points.

The pose recognition model is a machine learning model having a pose recognition function after being trained. The skeletal key points are position points of key parts on a skeleton. The skeletal key points are, for example, key position points of key parts such as a head, a shoulder, an elbow, a hand, a waist, a knee joint, or an ankle joint. A region in which connection lines between skeletal key points is a skeletal region.

The hidden layer is a term in a neural network model, and is an intermediate layer relative to an input layer and an output layer. The hidden layer includes model parameters obtained by training the neural network model. The hidden layer of the pose recognition model herein is an intermediate layer relative to an input layer of the pose recognition model and an output layer of the pose recognition model. All intermediate layers between the input layer and the output layer of the pose recognition model may be collectively referred to as a hidden layer, or the intermediate layers may be partitioned into a plurality of hidden layers. The hidden layer of the pose recognition model may include a plurality of layers of neural network structures. Each layer of neural network structure may include one or more neural network layers.

The hidden layer in the neural network model is configured to perform feature extraction or feature transformation on an input. For example, the hidden layer of the pose recognition model may perform skeletal feature point extraction or target region recognition on an inputted image.

In an embodiment, the determining, by the computer device, skeletal key points of a target in the to-be-processed image by using a hidden layer of the pose recognition model includes: obtaining an image region in which the target in the to-be-processed image is located through partition using a first hidden layer of the pose recognition model; and determining the skeletal key points in the image region by using a second hidden layer of the pose recognition model.

In an implementation, the pose recognition model may include more than one hidden layer, and different hidden layers have different functions. The computer device may first obtain an image region in which the target in the to-be-processed image is located through partition by using a first hidden layer of the pose recognition model; and then determine, by using a second hidden layer of the pose recognition model, the skeletal key points in the image region in which the target is located and that is obtained through partition. The first hidden layer may include one or more hidden layers, and the second hidden layer may include one or more hidden layers. In the structure of the model, the first hidden layer is located in front of the second hidden layer. A hidden layer may exist between the first hidden layer and the second hidden layer.

When there is more than one target in the to-be-processed image, there is also more than one image region obtained through partition by the first hidden layer of the pose recognition model. In this case, the second hidden layer of the pose recognition model may determine skeletal key points within each image region in the image region.

It may be understood that the manner of determining the skeletal key points of the targets in the to-be-processed image in this embodiment may be a top-down skeletal key point positioning manner. That is, each target is first detected through target detection, and then skeletal key point detection is performed for a region in which a single target is located based on a detection box.

In an embodiment, the determining, by the computer device, skeletal key points of a target in the to-be-processed image by using a hidden layer of the pose recognition model includes: determining, by the computer device, skeletal key points in the to-be-processed image by using a first hidden layer of the pose recognition model; and clustering the skeletal key points according to the target by using a second hidden layer of the pose recognition model, to obtain skeletal key points corresponding to each target, one skeletal region being predicted according to skeletal key points corresponding to one target.

In an implementation, the pose recognition model may include more than one hidden layer, and different hidden layers have different functions. The computer device may determine skeletal key points in the to-be-processed image by using a first hidden layer of the pose recognition model, and then cluster the skeletal key points according to the target by using a second hidden layer of the pose recognition model, to obtain skeletal key points corresponding to each target. The first hidden layer may include one or more hidden layers, and the second hidden layer may include one or more hidden layers. In the structure of the model, the first hidden layer is located in front of the second hidden layer. A hidden layer may exist between the first hidden layer and the second hidden layer.

When there is more than one target in the to-be-processed image, the second hidden layer of the pose recognition model may obtain more than one skeletal key point group by clustering the determined skeletal key points. In this case, one skeletal key point group is one cluster.

It may be understood that the manner of determining the skeletal key points of the targets in the to-be-processed image in this embodiment may be a bottom-up skeletal key point positioning manner. That is, all skeletal key points in the to-be-processed image are first detected, and then the skeletal key points are clustered into different targets.

Further, the computer device may further determine skeletal regions of the targets according to the skeletal key points of the targets by using a hidden layer of the pose recognition model, to output a pose-recognized image whose skeletal regions have been recognized.

The pose recognition model may be trained in a supervised training manner. Specifically, the computer device may obtain training samples, and determine training labels corresponding to the training samples, that is, images that correspond to the training samples and on which a skeletal region is marked, to perform supervised training according to the training samples and the corresponding training labels.

In an embodiment, after obtaining the to-be-processed image, the computer device automatically inputs the image into the trained machine learning model, and outputs, according to the machine learning model, the pose-recognized image whose skeletal region has been recognized. In this way, the skeletal region in the pose-recognized image may be used as a determined foreground region, to provide a basis for generating a trimap subsequently.

In an embodiment, the performing, by the computer device, image semantic segmentation on the to-be-processed image to obtain a semantically-segmented image includes: inputting the to-be-processed image into an image processing model; and obtaining the semantically-segmented image by using a semantic segmentation branch of the image processing model. The performing pose recognition on the to-be-processed image, to obtain a pose-recognized image whose skeletal region has been recognized includes: obtaining the pose-recognized image by using a pose recognition branch of the image processing model, pixels in the semantically-segmented image having pixel values represent semantic categories that the pixels are within, and being corresponding to pixels in the to-be-processed image, pixels in the target region being within a target semantic category, and pixels in the non-target region being not within the target semantic category. The skeletal region included in the pose-recognized image may be predicted according to skeletal key points.

It may be understood that in this embodiment, the image processing model may include a common structure in front and two parallel task branches behind. An output of the common structure is outputted to the two parallel task branches. The common structure is configured to perform image feature extraction on the to-be-processed image. The parallel task branches are a semantic segmentation branch and a pose recognition branch. The semantic segmentation branch performs image semantic segmentation based on extracted image features, and the pose recognition branch performs pose recognition according to the extracted image features.

During training of the image processing model, the parallel mask branches may be separately trained. That is, model parameters of the semantic segmentation branch are fixed, and a loss function of the pose recognition branch is constructed, to train the common structure and the pose estimation branch; and model parameters of the pose recognition branch are fixed, and a loss value function of the semantic segmentation branch is constructed, to train the common structure and the semantic segmentation branch. During training of the image processing model, the parallel mask branches may alternatively be trained at the same time. That is, a joint loss function of the pose recognition branch and the semantic segmentation branch is constructed, to train the common structure, the semantic segmentation branch, and the pose recognition branch at the same time.

In this embodiment, joint training and prediction are performed in a multitasking manner. In this way, during prediction, a semantic segmentation result and a pose estimation result can be obtained at a time, thereby improving efficiency.

In an embodiment, the image processing method further includes: performing, by the computer device, an operation on pixel values of pixels in the to-be-processed image and pixel values of corresponding pixels in the transparency mask image, and separating a foreground region from the to-be-processed image according to an operation result.

The transparency mask image is an image used for describing a foreground and a background of the to-be-processed image, and has the same size as the to-be-processed image. Pixel values of pixels, corresponding to foreground pixels in the to-be-processed image, in the transparency mask image are transparency values representing transparency; and pixel values of pixels, corresponding to background pixels in the to-be-processed image, in the transparency mask image are transparency values representing opaqueness. In this way, when image separation is performed on the to-be-processed image by using the transparency mask image, the foreground part in the to-be-processed image is actually multiplied by the transparency values representing transparency. Pixel values of the foreground part are kept unchanged, so that the foreground part is retained. The background part in the to-be-processed image is actually multiplied by the transparency values representing opaqueness. Pixel values of the background part are changed, so that the background part is removed. In this way, the image separation is completed.

In an implementation, after obtaining the transparency mask image for image separation from the to-be-processed image, the computer device may multiply pixels in the to-be-processed image and pixels in the transparency mask image according to locations, that is, performing a multiplication operation on a pixel value of a pixel in the to-be-processed image and a pixel value of a corresponding pixel in the transparency mask image, to separate a foreground region from the to-be-processed image according to a multiplication operation result.

Figure 8:
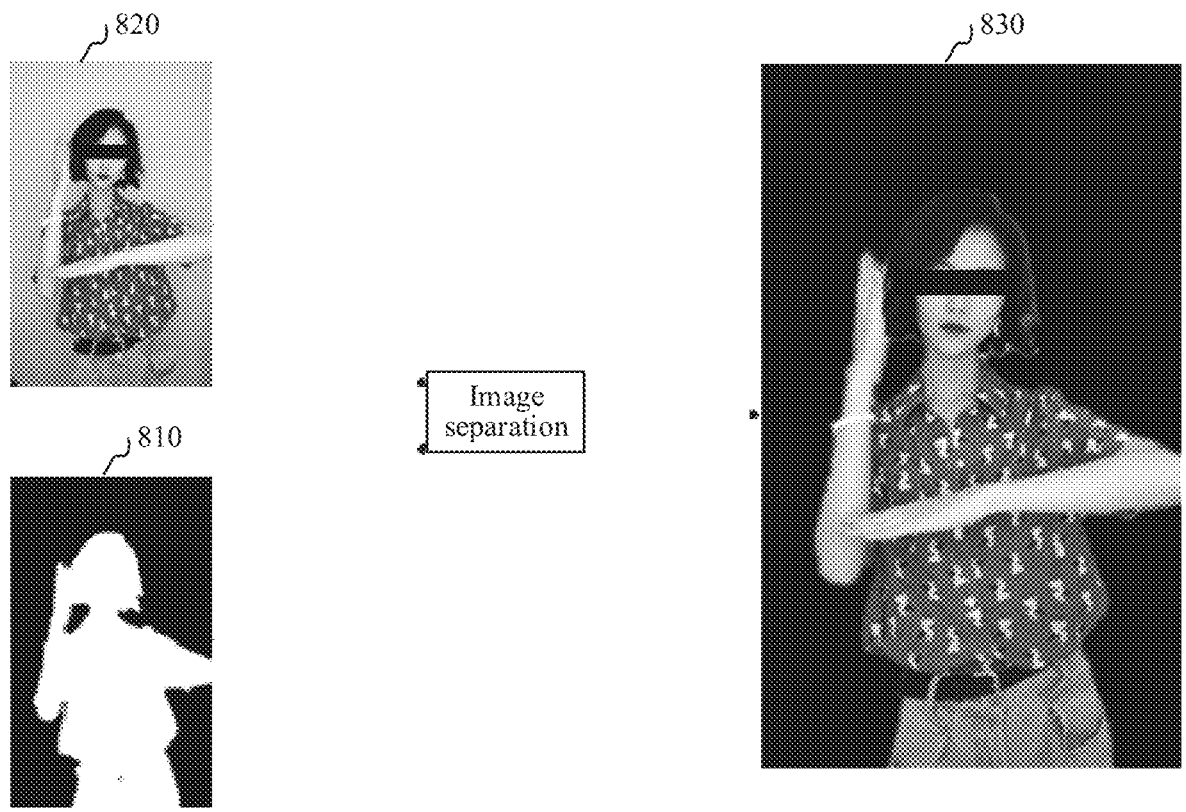
FIG. 8 is a schematic diagram of image separation from a to-be-processed image by using a transparency mask image according to an embodiment.

For example, FIG. 8 is a schematic diagram of image separation from a to-be-processed image by using a transparency mask image according to an embodiment. Referring to FIG. 8, after a to-be-processed image 820 is processed by using a transparency mask image 810, a target image 830 can be obtained. It may be clearly seen that in the target image 830, a foreground region is retained (that is, separated from the to-be-processed image), and a background part is removed through black coverage.

In this embodiment, the computer device processes the to-be-processed image by using the transparency mask image, to separate the foreground region, thereby efficiently completing image separation, and providing a basis for subsequent image editing processing.

Figure 9:
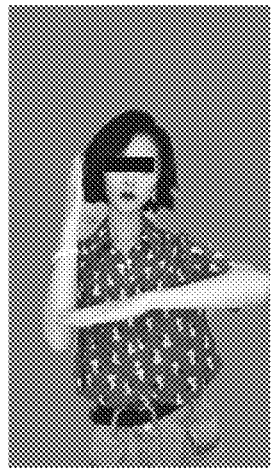
FIG. 9 is a comparison diagram of effects of human image matting between a plurality of manners according to an embodiment.
Figure 9:
Figure 9:
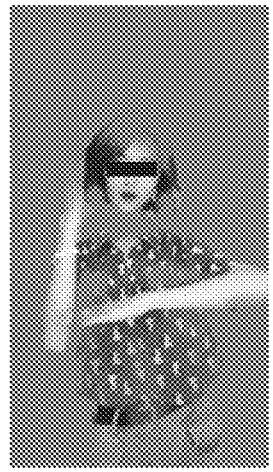
Figure 9:
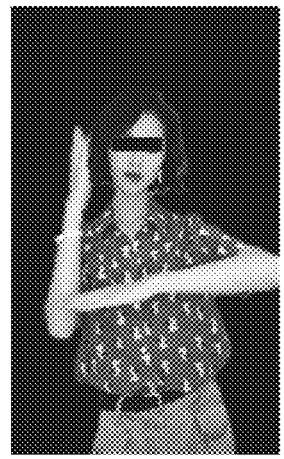
Figure 9:
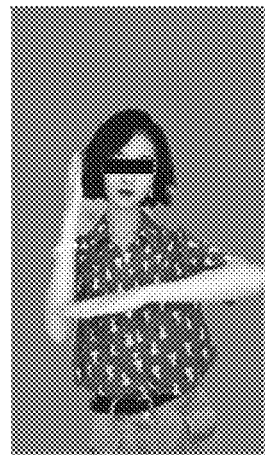

In a specific embodiment, the computer device further compares image matting effects between a target image obtained by performing human image matting on a human image based on this embodiment of this disclosure and a target image obtained by performing human image matting on the human image in another manner. FIG. 9(a) shows a target image obtained by performing human image matting according to the expanded semantically-segmented image 520 in FIG. 5. FIG. 9(b) shows a target image obtained by performing human image matting according to the semantically-segmented image 510 in FIG. 5. FIG. 9(c) shows a target image obtained by performing human image matting according to the trimap 540 in FIG. 5. FIG. 9(d) shows a target image obtained by performing human image matting according to the transparency mask image 720 in FIG. 7. FIG. 9(e) shows a target image obtained by performing human image matting after a transparency mask image is generated by using a deep learning algorithm (deep image matting) according to the semantically-segmented image 510 in FIG. 5. It may be clearly seen from comparison between figures in FIG. 9 that, FIG. 9(d) has the best image matting effect. That is, when compared with target images obtained in other manners, human image matting based on the transparency mask image obtained in this embodiment of this disclosure has the best effect.

In an embodiment, the obtaining, by the computer device, a to-be-processed image includes: obtaining, by the computer device, a to-be-processed video; and using a video frame included in the to-be-processed video as the to-be-processed image. The image processing method further includes: performing an editing operation on the to-be-processed image from which the foreground region has been separated, to obtain a corresponding edited image; and generating a target video according to the edited image, and then sharing the target video.

The to-be-processed video may be a video acquired in real time by using an image acquisition apparatus, or may be an existing video crawled from a network, or may be a video clip separated from an existing video, or may be a video synthesized by using more than one frame of image.

In an implementation, after obtaining the to-be-processed video, the computer device may use video frames included in the to-be-processed video as to-be-processed images, and perform steps of processing the to-be-processed image in the foregoing embodiments on each frame of to-be-processed image. The computer device may use all video frames included in the to-be-processed video as to-be-processed images, or may select video frames from video frames included in the to-be-processed video as to-be-processed images.

Further, the computer device may perform an editing operation on the to-be-processed image from which the foreground region has been separated, to obtain a corresponding edited image; and generate a target video according to the edited image. When the computer device uses some of the video frames in the to-be-processed video as to-be-processed images, the computer device may alternatively generate a target video according to video frames that are not used as to-be-processed images and generated edited images. Certainly, the computer device may alternatively generate a target video only according to the edited images. The editing operation may include an operation such as background replacement, foreground splicing, or foreground replication.

The computer device may store the generated target video locally, or transmit the target video to another computer device, or share the target video by using a social application, or the like. Sharing of the target video may be sharing the target video in a social session, or may be publishing the target video on a social content publishing platform, or the like.

For example, a user may record a video in real time by using a social application run on a terminal, processes the recorded video as a to-be-processed video, and after a target video is obtained, share the target video in the social application. The social application may be a short video recording application or the like.

It is to be understood that, although the steps are displayed sequentially according to the instructions of the arrows in the flowcharts of the embodiments, the steps are not necessarily performed sequentially according to the sequence instructed by the arrows. Unless otherwise explicitly specified in this specification, execution of the steps is not strictly limited, and the steps may be performed in other orders. Moreover, at least some of the steps in the foregoing embodiments may include a plurality of sub-steps or a plurality of stages. The sub-steps or the stages are not necessarily performed at the same moment, but may be performed at different moments. The sub-steps or the stages are not necessarily performed in sequence, but may be performed in turn or alternately with another step or at least some of sub-steps or stages of the another step.

Figure 10:
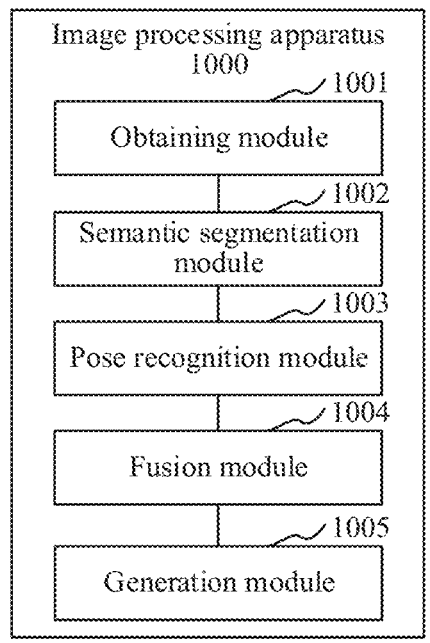
FIG. 10 is a structural block diagram of an image processing apparatus according to an embodiment.

As shown in FIG. 10, in an embodiment, an image processing apparatus 1000 is provided. Referring to FIG. 10, the image processing apparatus 1000 includes: an obtaining module 1001, a semantic segmentation module 1002, a pose recognition module 1003, a fusion module 1004, and a generation module 1005.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The obtaining module 1001 is configured to obtain a to-be-processed image.

The semantic segmentation module 1002 is configured to perform image semantic segmentation on the to-be-processed image to obtain a semantically-segmented image, the semantically-segmented image including a target region and a non-target region obtained through the semantic segmentation.

The pose recognition module 1003 is configured to perform pose recognition on the to-be-processed image, to obtain a pose-recognized image whose skeletal region has been recognized.

The fusion module 1004 is configured to fuse the target region and the non-target region of the semantically-segmented image and the skeletal region of the pose-recognized image, to obtain a trimap whose foreground region, background region, and recognition region have been obtained through partition.

The generation module 1005 is configured to generate, according to the to-be-processed image and the trimap, a transparency mask image for image separation from the to-be-processed image.

In an embodiment, the semantic segmentation module 1002 is further configured to: input the to-be-processed image into an image semantic segmentation model; output a semantic category probability distribution matrix by using the image semantic segmentation model; and generate the semantically-segmented image according to the semantic category probability distribution matrix, pixels in the semantically-segmented image having pixel values representing semantic categories that the pixels are within, and being corresponding to pixels in the to-be-processed image, pixels in the target region being within a target semantic category, and pixels in the non-target region being not within the target semantic category.

In an embodiment, the pose recognition module 1003 is further configured to: input the to-be-processed image into a pose recognition model; determine skeletal key points of a target in the to-be-processed image by using a hidden layer of the pose recognition model; and output, by using the pose recognition model, the pose-recognized image whose skeletal region has been recognized, the skeletal region being predicted according to the skeletal key points.

In an embodiment, the pose recognition module 1003 is further configured to: obtain an image region in which the target in the to-be-processed image is located through partition by using a first hidden layer of the pose recognition model; and determine the skeletal key points in the image region by using a second hidden layer of the pose recognition model.

In an embodiment, the pose recognition module 1003 is further configured to: determine skeletal key points in the to-be-processed image by using a first hidden layer of the pose recognition model; and cluster the skeletal key points according to the target by using a second hidden layer of the pose recognition model, to obtain skeletal key points corresponding to each target, one skeletal region being predicted according to skeletal key points corresponding to one target.

In an embodiment, the fusion module 1004 is further configured to: expand a region boundary between the target region and the non-target region in the semantically-segmented image; use a remaining non-target region in the semantically-segmented image after the expansion as the background region, and use a region, corresponding to the skeletal region of the pose-recognized image, in the semantically-segmented image as the foreground region, to obtain the trimap whose foreground region, background region, and recognition region have been obtained through partition, the recognition region of the trimap being a remaining region in the semantically-segmented image after the background region and the foreground region are excluded.

In an embodiment, the fusion module 1004 is further configured to: perform edge detection on the target region and the non-target region, to obtain the region boundary between the target region and the non-target region; and expand the region boundary in the semantically-segmented image toward two sides by using the region boundary as a center.

In an embodiment, the generation module 1005 is further configured to: perform global sampling on target pixels in a recognition region of the to-be-processed image according to the trimap, to select matching foreground pixels and matching background pixels for the target pixels; fuse the foreground pixels and the background pixels that match the target pixels, to obtain transparency corresponding to the target pixels; and generate, according to the transparency corresponding to the pixels in the to-be-processed image, the transparency mask image for image separation from the to-be-processed image.

In an embodiment, the generation module 1005 is further configured to: generate an intermediate image by using the transparency corresponding to the pixels in the trimap as pixel values of the pixels; and generate, after filtering and image morphology operations are performed on the intermediate image, the transparency mask image for image separation from the to-be-processed image.

In an embodiment, the target region is a human region; and the non-target region is a non-human region. The pose recognition module 1003 is further configured to perform human pose recognition on the to-be-processed image, to obtain a pose-recognized image whose human skeletal region has been recognized. The generation module 1005 is further configured to generate, according to the to-be-processed image and the trimap, a transparency mask image for human image matting on the to-be-processed image.

Figure 11:
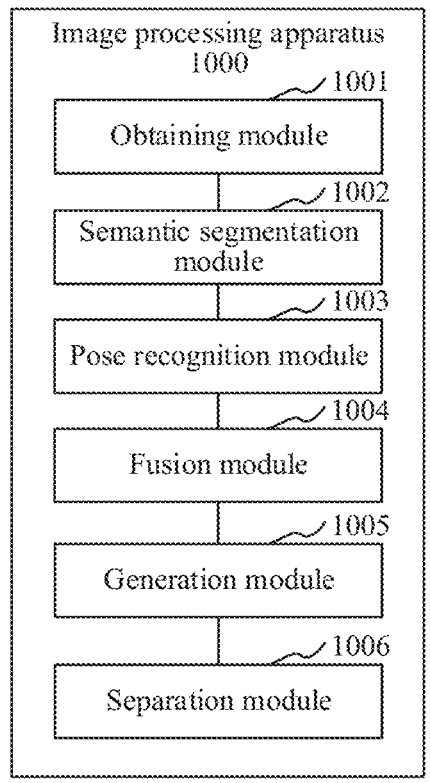
FIG. 11 is a structural block diagram of an image processing apparatus according to another embodiment.

As shown in FIG. 11, in an embodiment, the image processing apparatus 1000 further includes a separation module 1006, configured to perform an operation on pixel values of pixels in the to-be-processed image and pixel values of corresponding pixels in the transparency mask image, and separate a foreground region from the to-be-processed image according to an operation result.

In an embodiment, the obtaining module 1001 is further configured to: obtain a to-be-processed video; and use a video frame included in the to-be-processed video as the to-be-processed image. The separation module 1006 is further configured to perform an editing operation on the to-be-processed image from which the foreground region has been separated, to obtain a corresponding edited image; and generate a target video according to the edited image, and then share the target video.

In an embodiment, the semantic segmentation module 1002 is further configured to: input the to-be-processed image into an image processing model; and obtain the semantically-segmented image by using a semantic segmentation branch of the image processing model. The pose recognition module 1003 is further configured to obtain the pose-recognized image by using a pose recognition branch of the image processing model, pixels in the semantically-segmented image having pixel values representing semantic categories that the pixels are within, and being corresponding to pixels in the to-be-processed image, pixels in the target region being within a target semantic category, pixels in the non-target region being not within the target semantic category, and the skeletal region included in the pose-recognized image being predicted according to skeletal key points.

According to the image processing apparatus 1000, after a to-be-processed image is obtained, image semantic segmentation is automatically performed on the to-be-processed image to obtain a semantically-segmented image, and pose recognition is automatically performed on the to-be-processed image. Because the obtained semantically-segmented image includes a target region and a non-target region obtained through the semantic segmentation, and an obtained pose-recognized image includes a skeletal region, the two frames of images can be automatically fused to obtain a trimap whose foreground region, background region, and recognition region have been obtained through partition, and a transparency mask image for image separation from the to-be-processed image can be generated according to the to-be-processed image and the trimap. The entire process of generating the transparency mask image does not require participation of a user, which greatly improves generation efficiency of the transparency mask image, thereby improving image processing efficiency.

Figure 12:
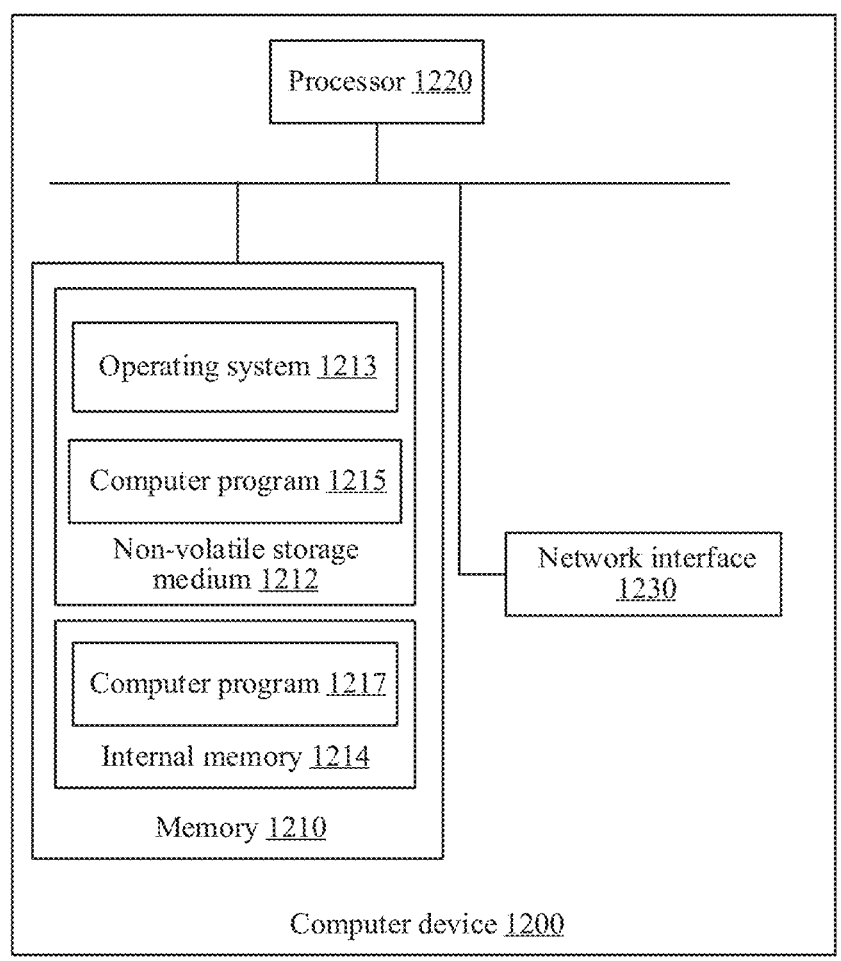
FIG. 12 is a structural block diagram of a computer device according to an embodiment.

FIG. 12 is a diagram of an internal structure of a computer device 1200 in an embodiment. The computer device 1200 may be specifically the terminal 110 or the server 120 in FIG. 1. As shown in FIG. 12, the computer device 1200 includes a processor 1220, a memory 1210, and a network interface 1230 connected by using a system bus. The memory 1210 includes a non-volatile storage medium 1212 and an internal memory 1214. The non-volatile storage medium 1212 of the computer device 1200 stores an operating system 1213 and may further store a computer program 1215, the computer program 1215, when executed by the processor 1220, causing the processor 1220 to implement the image processing method. The internal memory 1214 may also store a computer program, the computer program, when executed by the processor 1220, causing the processor 1220 to perform the image processing method. A person skilled in the art may understand that, the structure shown in FIG. 12 is only a block diagram of a part of a structure related to a solution of this disclosure and does not limit the computer device 1200 to which the solution of this disclosure is applied. Specifically, the computer device 1200 may include more or fewer components than those in the drawings, or some components are combined, or a different component deployment is used.

In an embodiment, the image processing apparatus provided in this disclosure may be implemented in a form of a computer program, and the computer program may be run on the computer device 1200 shown in FIG. 12. The memory 1210 of the computer device 1200 may store program modules forming the image processing apparatus, for example, the obtaining module 1001, the semantic segmentation module 1002, the pose recognition module 1003, the fusion module 1004, and the generation module 1005 shown in FIG. 10. A computer program formed by the program modules causes the processor to perform steps in the image processing method in the embodiments of this disclosure described in this specification.

For example, the computer device 1200 shown in FIG. 12 may obtain a to-be-processed image by using the obtaining module 1001 in the image processing apparatus 1000 shown in FIG. 10; perform image semantic segmentation on the to-be-processed image by using the semantic segmentation module 1002 to obtain a semantically-segmented image, the semantically-segmented image including a target region and a non-target region obtained through the semantic segmentation; perform pose recognition on the to-be-processed image by using the pose recognition module 1003, to obtain a pose-recognized image whose skeletal region has been recognized; fuse the target region and the non-target region of the semantically-segmented image and the skeletal region of the pose-recognized image by using the fusion module 1004, to obtain a trimap whose foreground region, background region, and recognition region have been obtained through partition; and generate, according to the to-be-processed image and the trimap by using the generation module 1005, a transparency mask image for image separation from the to-be-processed image.

In an embodiment, a computer device is provided, including a memory and a processor, the memory storing a computer program, the computer program, when executed by the processor, causing the processor to perform steps of the image processing method. The steps in the image processing method may be steps in the image processing method in the foregoing embodiments.

In an embodiment, a computer-readable storage medium is provided, storing a computer program, the computer program, when executed by a processor, causing the processor to perform the following image processing steps:
    obtaining a to-be-processed image;
    performing image semantic segmentation on the to-be-processed image to obtain a semantically-segmented image, the semantically-segmented image including a target region and a non-target region obtained through the semantic segmentation;

performing pose recognition on the to-be-processed image, to obtain a pose-recognized image whose skeletal region has been recognized;
fusing the target region and the non-target region of the semantically-segmented image and the skeletal region of the pose-recognized image, to obtain a trimap whose foreground region, background region, and recognition region have been obtained through partition; and
generating, according to the to-be-processed image and the trimap, a transparency mask image for image separation from the to-be-processed image.

In an implementation, the processor may perform the following steps by using the computer program:
inputting the to-be-processed image into an image semantic segmentation model;
outputting a semantic category probability distribution matrix by using the image semantic segmentation model; and
generating the semantically-segmented image according to the semantic category probability distribution matrix,
pixels in the semantically-segmented image having pixel values representing semantic categories that the pixels are within, and being corresponding to pixels in the to-be-processed image, pixels in the target region being within a target semantic category, and pixels in the non-target region being not within the target semantic category.

In an implementation, the processor may perform the following steps by using the computer program:
inputting the to-be-processed image into a pose recognition model;
determining skeletal key points of a target in the to-be-processed image by using a hidden layer of the pose recognition model; and
outputting, by using the pose recognition model, the pose-recognized image whose skeletal region has been recognized, the skeletal region being predicted according to the skeletal key points.

In an implementation, the processor may perform the following steps by using the computer program:
obtaining an image region in which the target in the to-be-processed image is located through partition using a first hidden layer of the pose recognition model; and
determining the skeletal key points in the image region by using a second hidden layer of the pose recognition model.

In an implementation, the processor may perform the following steps by using the computer program:
determining skeletal key points in the to-be-processed image by using a first hidden layer of the pose recognition model; and
clustering the skeletal key points according to the target by using a second hidden layer of the pose recognition model, to obtain skeletal key points corresponding to each target,
one skeletal region being predicted according to skeletal key points corresponding to one target.

In an implementation, the processor may perform the following steps by using the computer program:
expanding a region boundary between the target region and the non-target region in the semantically-segmented image; and
using a remaining non-target region in the semantically-segmented image after the expansion as the background region, and using a region, corresponding to the skeletal region of the pose-recognized image, in the semantically-segmented image as the foreground region, to obtain the trimap whose foreground region, background region, and recognition region have been obtained through partition,
the recognition region of the trimap being a remaining region in the semantically-segmented image after the background region and the foreground region are excluded.

In an implementation, the processor may perform the following steps by using the computer program:
performing edge detection on the target region and the non-target region, to obtain the region boundary between the target region and the non-target region; and
expanding the region boundary in the semantically-segmented image toward two sides by using the region boundary as a center.

In an implementation, the processor may perform the following steps by using the computer program:
performing global sampling on target pixels in a recognition region of the to-be-processed image according to the trimap, to select matching foreground pixels and matching background pixels for the target pixels;
fusing the foreground pixels and the background pixels that match the target pixels, to obtain transparency corresponding to the target pixels; and
generating, according to the transparency corresponding to the pixels in the to-be-processed image, the transparency mask image for image separation from the to-be-processed image.

In an implementation, the processor may perform the following steps by using the computer program:
generating an intermediate image by using the transparency corresponding to the pixels in the trimap as pixel values of the pixels; and
generating, after filtering and image morphology operations are performed on the intermediate image, the transparency mask image for image separation from the to-be-processed image.

In an implementation, the processor may perform the following step by using the computer program:
performing human pose recognition on the to-be-processed image, to obtain a pose-recognized image whose human skeletal region has been recognized; and
the generating, according to the to-be-processed image and the trimap, a transparency mask image for image separation from the to-be-processed image includes:
generating, according to the to-be-processed image and the trimap, a transparency mask image for human image matting on the to-be-processed image.

In an implementation, the processor may perform the following step by using the computer program:
performing an operation on pixel values of pixels in the to-be-processed image and pixel values of corresponding pixels in the transparency mask image, and separating a foreground region from the to-be-processed image according to an operation result.

In an implementation, the processor may perform the following steps by using the computer program:
obtaining a to-be-processed video;
using a video frame included in the to-be-processed video as the to-be-processed image; and
performing an editing operation on the to-be-processed image from which the foreground region has been separated, to obtain a corresponding edited image; and
generating a target video according to the edited image, and then sharing the target video.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be implemented. Any reference to a memory, a storage, a database, or another medium used in the embodiments provided in this disclosure can include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The technical features in the foregoing embodiments may be combined in different manners. For concise description, not all possible combinations of the technical features in the foregoing embodiments are described. However, the combinations of the technical features are to be considered as falling within the scope recorded in this specification provided that they do not conflict with each other.

The foregoing embodiments only show several implementations of this disclosure, and descriptions thereof are in detail, but are not to be understood as a limitation to the patent scope of this disclosure. A person of ordinary skill in the art may further make several variations and improvements without departing from the ideas of this disclosure, and such variations and improvements all fall within the protection scope of this disclosure. Therefore, the protection scope of this disclosure shall be subject to the protection scope of the appended claims.

What is claimed is:

1. An image processing method, comprising:
    obtaining a to-be-processed image;
    performing image semantic segmentation on the to-be-processed image to obtain a semantically-segmented image, the semantically-segmented image comprising a target region and a non-target region obtained through the semantic segmentation;
    inputting the to-be-processed image into a pose recognition model;
    partitioning an image region in which the target in the to-be-processed image is located using a first hidden layer of the pose recognition model;
    determining first skeletal key points corresponding to the target in the image region using a second hidden layer of the pose recognition model, the first hidden layer being located in front of the second hidden layer;
    determining a plurality of skeletal key points in the to-be-processed image using the first hidden layer of the pose recognition model;
    clustering the plurality of skeletal key points according to targets in the to-be-processed image using the second hidden layer of the pose recognition model, to obtain second skeletal key points corresponding to the target;
    outputting, using the pose recognition model, a pose-recognized image recognizing skeletal region, the skeletal region being predicted according to the first skeletal key points and the second skeletal key points;
    fusing the target region and the non-target region of the semantically-segmented image with the skeletal region of the pose-recognized image, to obtain a trimap comprising foreground region, background region, and recognition region; and
    generating, according to the to-be-processed image and the trimap, a transparency mask image for image separation from the to-be-processed image.

2. The method of claim 1, wherein the performing image semantic segmentation on the to-be-processed image to obtain the semantically-segmented image comprises:
    inputting the to-be-processed image into an image semantic segmentation model;
    outputting a semantic category probability distribution matrix using the image semantic segmentation model; and
    generating the semantically-segmented image according to the semantic category probability distribution matrix, wherein pixels in the semantically-segmented image have pixel values representing semantic categories to which the pixels belong and are corresponding to pixels in the to-be-processed image, pixels in the target region belong to a target semantic category, and pixels in the non-target region do not belong to the target semantic category.

3. The method of claim 1, wherein the fusing the target region and the non-target region of the semantically-segmented image with the skeletal region of the pose-recognized image to obtain the trimap comprises:
    expanding a region boundary between the target region and the non-target region in the semantically-segmented image; and
    using a remaining non-target region in the semantically-segmented image after the expansion as the background region and using a region corresponding to the skeletal region of the pose-recognized image in the semantically-segmented image as the foreground region, to obtain the trimap comprising the foreground region, the background region, and recognition region, the recognition region of the trimap being a remaining region in the semantically-segmented image excluding the background region and the foreground region.

4. The method of claim 3, wherein the expanding the region boundary between the target region and the non-target region in the semantically-segmented image comprises:
    performing edge detection on the target region and the non-target region to obtain the region boundary between the target region and the non-target region; and
    expanding the region boundary in the semantically-segmented image toward two sides using the region boundary as a center.

5. The method of claim 1, wherein the generating the transparency mask image for separating image from the to-be-processed image comprises:
    performing global sampling on target pixels in a recognition region of the to-be-processed image according to the trimap, to select matching foreground pixels and matching background pixels for the target pixels;
    fusing the matching foreground pixels and the matching background pixels, to obtain transparency corresponding to the target pixels; and
    generating, according to the transparency corresponding to the target pixels, the transparency mask image for image separation from the to-be-processed image.

6. The method of claim 5, wherein the generating the transparency mask image for image separation from the to-be-processed image comprises:
- generating an intermediate image by using the transparency corresponding to the pixels in the trimap as pixel values of the pixels; and
- generating, after filtering and image morphology operations are performed on the intermediate image, the transparency mask image for image separation on the to-be-processed image.

7. The method of claim 1, wherein the target region is a human region, the non-target region is a non-human region, and the performing the pose recognition on the to-be-processed image, to obtain the pose-recognized image comprises:
- performing human pose recognition on the to-be-processed image, to obtain a pose-recognized image recognizing human skeletal region; and
- the generating the transparency mask image for image separation from the to-be-processed image comprises:
- generating, according to the to-be-processed image and the trimap, the transparency mask image for performing human image matting on the to-be-processed image.

8. The method of claim 1, further comprising:
- performing an operation on pixel values of pixels in the to-be-processed image and pixel values of corresponding pixels in the transparency mask image; and
- separating a foreground region from the to-be-processed image according to a result of the operation.

9. The method of claim 8, wherein the obtaining the to-be-processed image comprises:
- obtaining a to-be-processed video;
- using a video frame in the to-be-processed video as the to-be-processed image; and
- the method further comprises:
  - performing an editing operation on the to-be-processed image from which the foreground region has been separated, to obtain a corresponding edited image; and
  - generating a target video according to the edited image.

10. An image processing apparatus, comprising:
- a memory operable to store computer-readable instructions; and
- a processor operable to read the computer-readable instructions, the processor when executing the computer-readable instructions is configured to:
  - obtain a to-be-processed image;
  - perform image semantic segmentation on the to-be-processed image to obtain a semantically-segmented image, the semantically-segmented image comprising a target region and a non-target region obtained through the semantic segmentation;
  - input the to-be-processed image into a pose recognition model;
  - partition an image region in which the target in the to-be-processed image is located using a first hidden layer of the pose recognition model;
  - determine first skeletal key points corresponding to the target in the image region using a second hidden layer of the pose recognition model, the first hidden layer being located in front of the second hidden layer;
  - determine a plurality of skeletal key points in the to-be-processed image using the first hidden layer of the pose recognition model;
  - cluster the plurality of skeletal key points according to targets in the to-be-processed image using the second hidden layer of the pose recognition model, to obtain second skeletal key points corresponding to the target;
  - output, using the pose recognition model, a pose-recognized image recognizing skeletal region, the skeletal region being predicted according to the first skeletal key points and the second skeletal key points;
  - fuse the target region and the non-target region of the semantically-segmented image with the skeletal region of the pose-recognized image, to obtain a trimap comprising foreground region, background region, and recognition region; and
  - generate, according to the to-be-processed image and the trimap, a transparency mask image for image separation from the to-be-processed image.

11. The apparatus of claim 10, wherein the processor is configured to:
- input the to-be-processed image into an image semantic segmentation model;
- output a semantic category probability distribution matrix using the image semantic segmentation model; and
- generate the semantically-segmented image according to the semantic category probability distribution matrix, wherein pixels in the semantically-segmented image have pixel values representing semantic categories to which the pixels belong and are corresponding to pixels in the to-be-processed image, pixels in the target region belong to a target semantic category, and pixels in the non-target region do not belong to the target semantic category.

12. The apparatus of claim 10, wherein the processor is configured to:
- expand a region boundary between the target region and the non-target region in the semantically-segmented image; and
- use a remaining non-target region in the semantically-segmented image after the expansion as the background region and using a region corresponding to the skeletal region of the pose-recognized image in the semantically-segmented image as the foreground region, to obtain the trimap comprising the foreground region, the background region, and recognition region, the recognition region of the trimap being a remaining region in the semantically-segmented image excluding the background region and the foreground region.

13. The apparatus of claim 10, wherein the processor is configured to:
- perform global sampling on target pixels in a recognition region of the to-be-processed image according to the trimap, to select matching foreground pixels and matching background pixels for the target pixels;
- fuse the matching foreground pixels and the matching background pixels, to obtain transparency corresponding to the target pixels; and
- generate, according to the transparency corresponding to the target pixels, the transparency mask image for image separation from the to-be-processed image.

14. A non-transitory computer-readable storage medium, having processor executable instructions stored thereon for causing a processor to:
- obtain a to-be-processed image;
- perform image semantic segmentation on the to-be-processed image to obtain a semantically-segmented image, the semantically-segmented image comprising a target region and a non-target region obtained through the semantic segmentation;

input the to-be-processed image into a pose recognition model;

partition an image region in which the target in the to-be-processed image is located using a first hidden layer of the pose recognition model;

determine first skeletal key points corresponding to the target in the image region using a second hidden layer of the pose recognition model, the first hidden layer being located in front of the second hidden layer;

determine a plurality of skeletal key points in the to-be-processed image using the first hidden layer of the pose recognition model;

cluster the plurality of skeletal key points according to targets in the to-be-processed image using the second hidden layer of the pose recognition model, to obtain second skeletal key points corresponding to the target;

output, using the pose recognition model, a pose-recognized image recognizing skeletal region, the skeletal region being predicted according to the first skeletal key points and the second skeletal key point;

fuse the target region and the non-target region of the semantically-segmented image with the skeletal region of the pose-recognized image, to obtain a trimap comprising foreground region, background region, and recognition region; and generate, according to the to-be-processed image and the trimap, a transparency mask image for image separation from the to-be-processed image.

* * * * *